Figure 1:
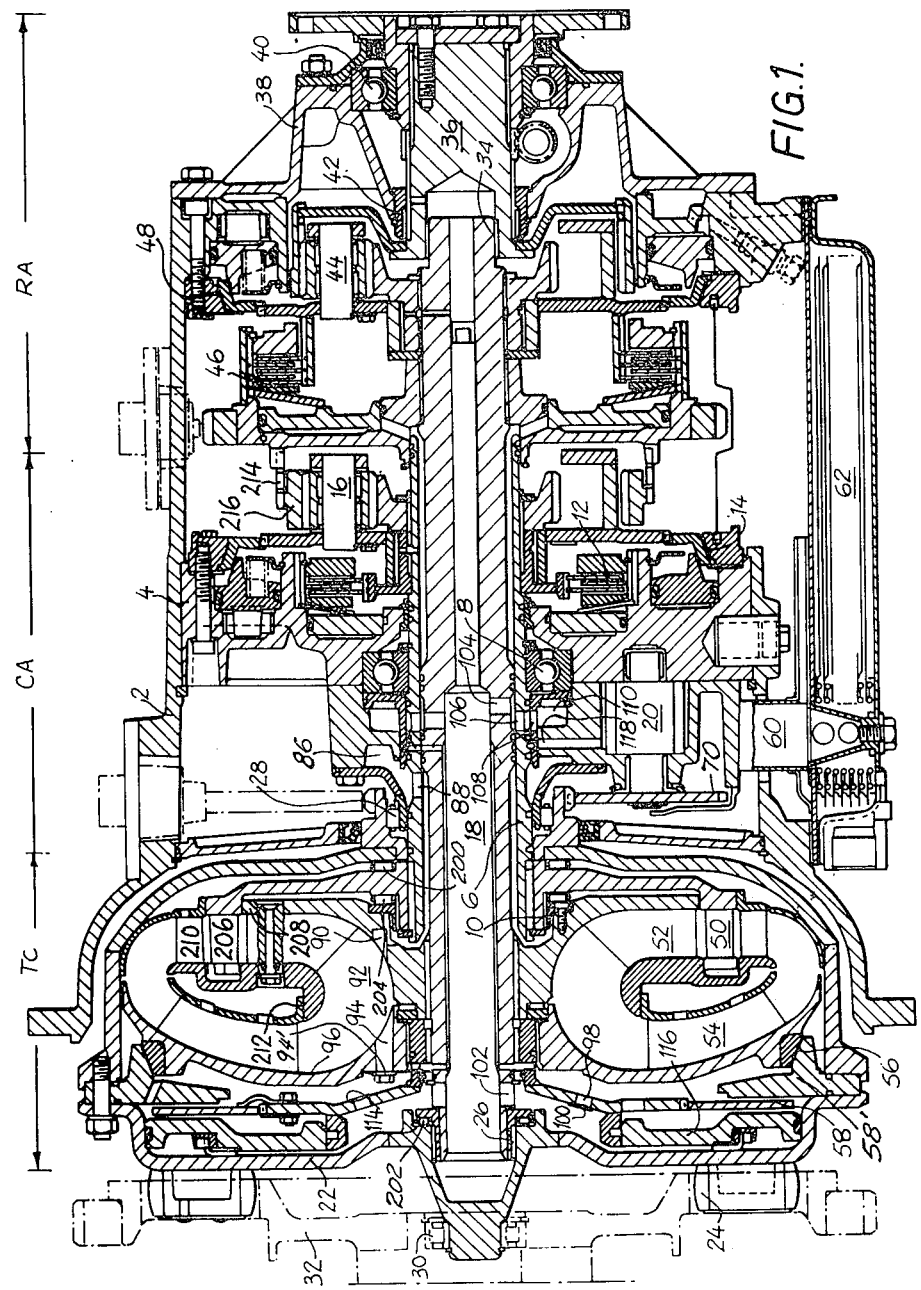

United States Patent [19]

Ahlen

[11] 4,011,775
[45] Mar. 15, 1977

[54] TRANSMISSION INCLUDING A HYDRODYNAMIC TORQUE CONVERTER

[75] Inventor: Karl Gustav Ahlen, Bromma Stockholm, Sweden

[73] Assignee: S.R.M. Hydromekanik Aktiebolag, Stockholm-Vallingby, Sweden

[22] Filed: Feb. 12, 1975

[21] Appl. No.: 549,371

[30] Foreign Application Priority Data

Feb. 14, 1974 United Kingdom ............... 6856/74
Dec. 18, 1974 United Kingdom ............. 54769/74

[52] U.S. Cl. .................................. 74/732; 74/732
[51] Int. Cl.² ...................................... F16H 47/00
[58] Field of Search ............ 74/730, 731, 732, 733

[56] References Cited

UNITED STATES PATENTS 3,831,463  8/1974  Ahlen .................................. 74/732

*Primary Examiner*—Samuel Scott
*Assistant Examiner*—Frank H. McKenzie, Jr.
*Attorney, Agent, or Firm*—Larson, Taylor and Hinds

[57] ABSTRACT

A transmission of the type having a rotating casing, a stationary housing and a chamber including a pump part, a guide part and a turbine part. Brakes are provided for connecting the guide part to the turbine for rotation therewith or to the stationary housing. Independent radial and axial bearings are provided between the said parts of the torque converter allowing radial displacement within the clearance of the radial bearing independent of the axial force on the axial bearing.

6 Claims, 2 Drawing Figures

TRANSMISSION INCLUDING A HYDRODYNAMIC TORQUE CONVERTER

This invention relates to a transmission including a hydrodynamic torque converter of the type having a rotatable casing and a stationary housing and utilizing a guide vane ring which in one driving range acts as a turbine member for transmitting torque via a gear to a turbine shaft and which, in another driving range, is held stationary to function as a stationary guide vane ring.

Torque converter transmission of the above type are well known and are used for railway, bus, truck, and earth-moving equipment applications, and are normally fully automatic units which also normally include a lock-up clutch. They are known as transmission of the SRM system and were basically developed by SRM Hydromekanik AB and earlier by Svanska Rotor Maskiner.

A torque converter of the type referred to has a rotatable casing enclosing the torque converter system and frequently also a lock-up clutch. This rotatable casing is journalled at the rear end in a stationary housing of the transmission and at the front end in the centre of a flywheel or the end of a crank shaft, of the engine on which it is mounted, and the stationary casing of the transmission is normally bolted to the flywheel housing of the engine. The turbine shaft and the guide vane shaft are at the rear end also journalled in the stationary housing and at the front end in the rotatable casing, directly or indirectly. The shafts are mainly axially loaded thus giving a fixed centre of rotation if journalled in a ball bearing.

Torque converters of the type in question include a planet gear between the turbine shaft and the guide vane shaft, alternatively operating with a friction coupling between the guide vane shaft and the rotating casing. The three elements, the rotating casing, the turbine and the guide vane, must run concentrically to each other within the limits of the sealing clearances necessary to obtain good efficiency.

Misalignment between the stationary casing of the torque converter and the axis of rotation of the crank shaft, as well as the run-out of the crank shaft end, especially under some driving conditions, are difficult to keep within the narrow limits required with the journalling system for the transmission hitherto used. In fact, it has been necessary when mounting the transmission on the engine bell housing to check existing run-outs and make corrections or alternatively to compromise by allowing larger eccentricities between the shafts than desirable from the efficiency standpoint.

It is an object of the present invention to provide a system for journalling the shafts in a transmission of the type referred to which allows a substantially larger run-out and misalignment without wear of sealing edges in the blade system or without conflict of bearing surfaces, due to the misalignment and/or the run-out, or without having to increase sealing clearances and bearing clearances beyond those desirable from the efficiency standpoint.

With the bearing arrangement according to the invention the result is that a run-out of the front end bearing of the rotating casing of the torque converter produces a relatively small radial displacement between different members of the torque converter system, such as the pump, turbine and guide vanes, even under conditions when a planet gear connection between the guide vane shaft and the turbine shaft is engaged or is causing those shafts at the rear end to revolve around the same axis of rotation when the guide vane brake is connected.

According to the present invention there is, therefore, provided a transmission including a hydrodynamic torque converter of the type having a rotatable casing and a stationary housing and utilizing a guide vane ring which in one driving range acts as a turbine member for transmitting torque via a gear to a turbine shaft and which, in another driving range, is held stationary to function as a stationary guide vane ring, characterized in that between a guide vane shaft and a turbine shaft there is disposed an engageable and releasable planet gear and between said guide vane shaft and the stationary housing there is disposed a brake to stall the guide vane shaft or release it for rotation in either direction and in that independent radial and axial bearings are included between the members of the torque converter allowing radial displacement within the clearance of the radial bearing independent of axial force on the axial bearing.

Figure 2:
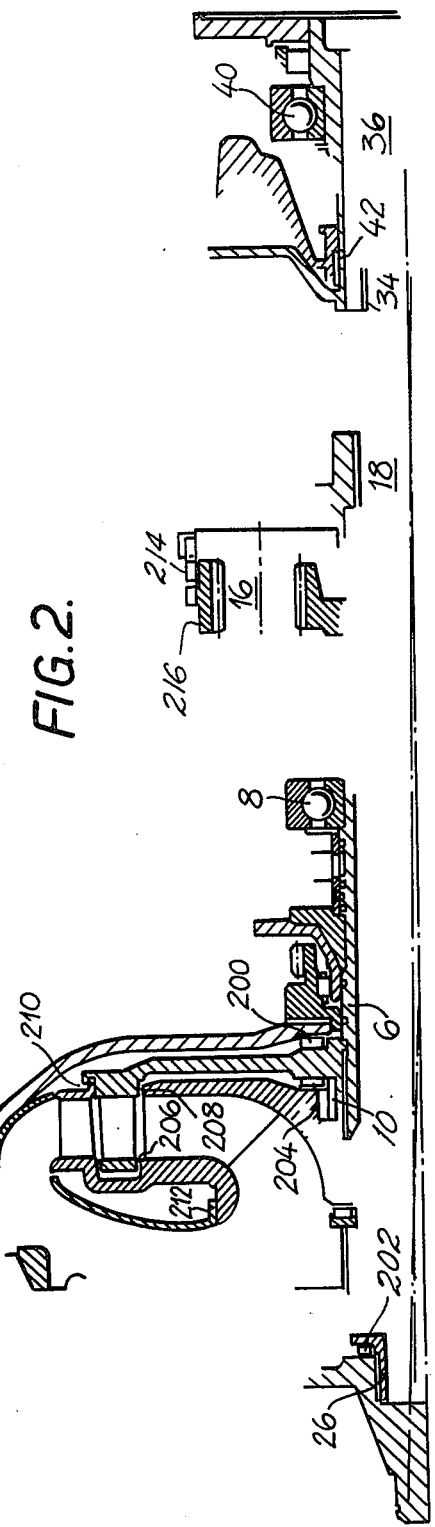

The invention will be hereinafter more fully described by way of example with reference to the embodiments thereof illustrated in the accompanying drawings, in which:

FIG. 1 shows a longitudinal section of a torque converter transmission of the type referred to, having the rotating parts journalled according to the invention; and FIG. 2 is a view taken in a longitudinal plane and showing some elements to show diagrammatically the influence of misalignment.

The transmission of FIG. 1 may be regarded as an assembly of three main parts, namely, a torque converter TC of the type having a rotatable casing 22, a central assembly CA of operatively associated components and a rear assembly RA of operatively associated components.

The associated components of the central assembly CA are carried in a stationary member 4 which is mounted in a stationary housing 2 and through which the torque converter guide vane shaft 6 extends and is journalled in a bearing 8.

The central stationary member 4 also carries a guide vane shaft brake 12 and a planet gear 16 interposed between the guide vane shaft 6 and a turbine shaft 18, and a brake 14 for the planet gear carrier of planet gear 16.

A feeder fluid gear pump 20 which receives fluid via pipe 60 from a heat exchanger 62 comprises two externally meshing gears of which one is driven through a gear 70 on the rotatable casing 22 directly from a flywheel 32 through rubber cushions 24.

The turbine shaft 18 is journalled in the rotatable casing 22 through a plain bearing 26. The rotatable casing 22 is, at it rear end, journalled in the central stationary member 4 in a radial bearing 28 and at its front end in the flywheel 32 through a bearing 30. The turbine shaft 18 is, at its rear end, journalled through a plain bearing 34 in an output shaft 36 which, in turn, is journalled in a rear cover 38 by a ball bearing 40 and a radial bearing 42.

Between the turbine shaft 18 and the output shaft 36 there is a reverse planet gear arrangement having a planet gear 44 giving a direct connection between the shafts 18 and 36 when a clutch 46 is engaged and reversing the direction of rotation of the turbine shaft 18 when a brake 48 is engaged and the clutch 46 is released.

In the rotatable casing 22, a guide vane ring 50 is mounted on the guide vane shaft 6 and on the turbine shaft 18 a turbine member 52 is mounted. The rotatable casing 22 also contains a pump member 54, connectable or releasable from the rotatable casing through a clutch 56. A lock-up clutch arrangement 58 is also included for connecting the turbine shaft 18 directly to the rotatable casing 22. More specifically, for hydraulic drive the fluid from pump 20 passes through chamber 86 and holes 88 to the space between shafts 6 and 18 and through opening 90 into the working chamber 92 whereat it acts to move pump part 96 to the left causing engagement of clutch 56. Said fluid then passes through hole 94 and one-way valve element 94' and then through one-way valve 100, the hole 102 and through the central bore of turbine shaft 18 and then through holes 104 and 106 to chamber 110 from which the fluid drains. For lock-up by means of element 58, the fluid path is essentially reversed, i.e. the fluid enters opening 102 but since it cannot pass in the reverse direction through one-way valve 100, it acts upon piston 116 urging it to the right to cause engagement of element 58 with element 58' of the rotating casing. The fluid then passes through a one-way valve 114 urging element 96 to the left whereby the fluid enters the working chamber 92 and returns through opening 90 and the above noted passages back to the area of pump 20 wherein, in direct drive, means will be provided for draining said fluid.

Considered more in detail it will be seen from the drawings that axially the guide vane shaft 6 is journalled in the stationary casing by the bearing 8, while the rotatable casing 22 is axially journalled in relation to the guide vane shaft 6 by a plain or needle bearing 200 in one direction, and in the opposite direction axially journalled by a plain or needle bearing 202 between the rotating casing and the turbine shaft and through the turbine shaft 18 to the guide vane shaft 6 by a plain or needle bearing 204 in the other direction. Thus the turbine is in the same way through the bearing 204 axially journalled in one direction in relation to the guide vane shaft and in the other direction through the bearing 202 and the rotating casing 22 and the bearing 200. Thus, both the rotating casing and the turbine are completely axially journalled in relation to each other through three bearings 200, 204 and 202 and the whole group is axially supported though the bearing 8 in relation to the stationary housing 2. Further, the turbine shaft 18 is radially journalled at the front end through the bearing 26, unable to sustain axial thrust and at the rear end through the bearing 34, which also only sustains radial thrust. The guide vane shaft 6 is at its front end journalled in the turbine by the bearing 10. Further, the rotating casing 22 at its rear end is radially journalled by a bearing 28 in an extension of the central stationary member 4.

The bearings mentioned allow a certain run-out at the front end of the rotating casing before the sealing edge surfaces 206, 210 and 212 move into radial contact. This allowed run-out is however reduced when running the torque converter, due to the fact that the planet gear 16 to some degree requires that the turbine shaft 18 at that axial position of the planet gear and the guide vane shaft 6 have the same axis of rotation. This requirement is in some degree eliminated by inserting a coupling 214 adapted to take up eccentricity between the outer race of the planet gear 216 and the turbine shaft 18. Nevertheless, however, when engaged this planet gear determines to a high degree the axis of rotation of the guide vane shaft 6 or if the guide vane shaft is stalled, by the brake 12, the axis of rotation of the guide vane shaft 6 is largely dependent on its bearing together with the brake, also limiting the allowable eccentricity of the front end of the rotating casing 22.

With the above bearing arrangement is is possible to have radial clearances in the radial bearings absorbing misalignment at the same time as axial forces are helpful in creating torque urging the axes into alignment with each other, while with earlier arrangements the axial forces gave the shafts through the ball bearings fixed centres. In the present invention, however, the axial bearing for the group is not loaded by hydraulic axial forces and, therefore, has the possibility of adjusting the axis of rotation of the shaft, depending on other forces, and this also to a high degree is the case with the remaining radial bearings. On the other hand, run-out between the turbine and the guide vane shafts 18 and 6 respectively is limited by the bearing 10 safeguarding the sealing edge surfaces at 206, 208 and 210, and the bearing 26 safeguarding the sealing edge surfaces 212, due to the long distance to the rear of the second bearing for the turbine shaft 18. In this way, in spite of the effect of the planet gear 16 or the guide vane shaft 6 and the brake 12, the highly desirable large allowable run-out of the front end of the rotating casing is obtained while still allowing the desired narrow sealing clearances.

A further feature of the bearing system of the present invention is a reduced necessity of balancing axial forces by providing larger capacity axial thrust bearings, and by the arrangement that the axial thrust bearings, due to the flexibility of the axially journalled parts, especially the rear wall of the rotatable casing 22 and the turbine shaft 18 provide a more uniform circumferential load.

FIG. 2 shows diagrammatically by way of example that if for a torque converter of the type referred to 1.0 mm run-out of the front end of the rotatable casing 22 is required and the plain bearing between the rotatable casing and the turbine shaft 18 has a bearing clearance of 0.2 mm and the bearing between the turbine and the guide vane shaft has a radial clearance of 0.1 mm, this will only influence the sealing clearances of the sealing edge surfaces 206 to 210 by less than 0.1% and the clearance in the sealing 212 by almost zero. Thus, even if the planet gear is centering the rear end of the guide vane shaft 6 with the turbine shaft 18, it is deflected less than 0.2 mm or the bearing 8 is running out of centre about 0.1 mm. This deflection of 0.2 mm and the running out of centre of almost 0.1 mm are both possible since the bearing 8 has a sufficiently large clearance and no axial thrust, and on the other hand the turbine shaft 18 needs a rather small force to be deflected 0.2 mm. Further, the planet gear 16 as said has its own possiblity to run-out of centre because of its 'floating-out' bearing race.

The dimensions mentioned above are applicable for a system where the turbine shaft 18 is about 530 mm long and the remaining dimensions in proportion. For such torque converters the input power may be up to 300 h.p. and the static and dynamic run-out of the centre of the flywheel 32 have been shown in many cases to be of a size not as great as 1 mm, but more usually 0.8 mm, which hitherto has created difficult problems which the bearing system as described has solved or, if not completely solved, considerably reduced and, at the same time creating better conditions for sealing the edge surfaces of the planet gears and the bearings.

What we claim is:

1. A transmission including a hydrodynamic torque converter of the type having a turbine member which has a turbine shaft operatively associated therewith, rotatable casing member having a pump part operatively associated therewith and a stationary housing, and utilizing a guide member having a guide vane ring mounted in a guide vane shaft, which guide member in one driving range acts as a turbine part for transmitting torque via a gear to the turbine shaft and which, in another driving range, is held stationary to function as a stationary guide vane ring, characterized in that between the guide vane shaft and the turbine shaft there is disposed an engageable and releasable planet gear and between said guide vane shaft and the stationary housing there is disposed a brake to stall the guide vane shaft or release it for rotation in either direction, and in that independent radial and axial bearings are included between each of the said members of the torque converter and the other members thereof allowing radial displacement within the clearance of the radial bearing independent of axial force on the axial bearing.

2. A transmission according to claim 1 in which the guide vane shaft is axially journalled in relation to the stationary housing while the rotating casing member and the turbine shaft are axially journalled through each other with respect to the guide vane shaft.

3. A transmission according to claim 1 wherein the clearances in the bearing between the turbine member and the rotating casing member are slightly smaller than the clearances of the seals between the pump part and the turbine member of the torque converter.

4. A transmission according to claim 1 in which the radial clearance between the guide vane shaft and the turbine member is slightly smaller than the clearance of the seals between the guide vanes and the turbine member of the torque converter.

5. A transmission according to claim 1 in which the radial bearing between the turbine member and the rotating casing member has a clearance of between 20 and 30% of the allowed run-out of the front end of the rotating casing member.

6. A transmission according to claim 1 in which the clearance in the radial bearing between the turbine member and the guide member is at least 10 to 20% of the required run-out of the front end of the rotating casing member.

* * * * *

UNITED STATES PATENT OFFICE
CERTIFICATE OF CORRECTION

PATENT NO. : 4,011,775
DATED : March 15, 1977
INVENTOR(S) : Karl Gustav Ahlen

It is certified that error appears in the above-identified patent and that said Letters Patent are hereby corrected as shown below:

At column 3, line 27, please change "left" to --right--.

Signed and Sealed this fifth Day of July 1977

[SEAL]

Attest:

RUTH C. MASON
Attesting Officer

C. MARSHALL DANN
Commissioner of Patents and Trademarks